(12) United States Patent
Devitt-Carolan et al.

(10) Patent No.: US 10,459,802 B2
(45) Date of Patent: Oct. 29, 2019

(54) BACKUP IMAGE RESTORE

(71) Applicant: HEWLETT-PACKARD DEVELOPMENT COMPANY, L.P., Houston, TX (US)

(72) Inventors: Taram S Devitt-Carolan, Palo Alto, CA (US); Rick Bramley, Mansfield, MA (US); Reny Paul, Bangalore (IN); Anil Kumar S R, Bangalore (IN)

(73) Assignee: Hewlett-Packard Development Company, L.P., Spring, TX (US)

( * ) Notice: Subject to any disclaimer, the term of this patent is extended or adjusted under 35 U.S.C. 154(b) by 148 days.

(21) Appl. No.: 15/539,840

(22) PCT Filed: Jan. 30, 2015

(86) PCT No.: PCT/US2015/013995
§ 371 (c)(1),
(2) Date: Jun. 26, 2017

(87) PCT Pub. No.: WO2016/122670
PCT Pub. Date: Aug. 4, 2016

(65) Prior Publication Data
US 2017/0371749 A1 Dec. 28, 2017

(51) Int. Cl.
*G06F 11/00* (2006.01)
*G06F 11/14* (2006.01)
(Continued)

(52) U.S. Cl.
CPC ...... *G06F 11/1469* (2013.01); *G06F 9/45558* (2013.01); *G06F 11/0793* (2013.01);
(Continued)

(58) Field of Classification Search
CPC ............ G06F 11/1469; G06F 9/45558; G06F 11/0793; G06F 11/1658; G06F 11/2094
See application file for complete search history.

(56) References Cited

U.S. PATENT DOCUMENTS 5,873,101 A 2/1999 Klein
7,043,504 B1 5/2006 Moore et al.
(Continued)

OTHER PUBLICATIONS

"Backup and Recovery Solution Optimised for Hyper-v Virtual Environment"; Sep. 30, 2014; 3 pages.
(Continued)

*Primary Examiner* — Charles Ehne
(74) *Attorney, Agent, or Firm* — HPI Patent Department

(57) ABSTRACT

An example apparatus includes a virtual drive controller module to receive a read request from a guest virtual machine (VM) during a restore operation. The apparatus also includes a virtual drive manager module to determine whether data associated with the read request is stored in a storage volume of the guest VM using a sector mapping lookup table during the restore operation. In response to a determination that the data is absent in the storage volume, the virtual drive manager module is to copy the data from a backup image associated with the guest VM to the storage volume, update the sector mapping lookup table to indicate that the data is stored in the storage volume, and transmit the data to the guest VM.

20 Claims, 6 Drawing Sheets

(51) Int. Cl.
*G06F 11/07* (2006.01)
*G06F 11/16* (2006.01)
*G06F 9/455* (2018.01)

(52) U.S. Cl.
CPC ...... *G06F 11/1438* (2013.01); *G06F 11/1658* (2013.01); *G06F 2009/45575* (2013.01); *G06F 2009/45579* (2013.01); *G06F 2201/815* (2013.01)

(56) References Cited

U.S. PATENT DOCUMENTS

| | | |
|---|---|---|
| 7,093,086 B1 | 8/2006 | VanRietschote |
| 8,346,726 B2 | 1/2013 | Liu et al. |
| 2011/0087874 A1 | 4/2011 | Timashev et al. |
| 2011/0138165 A1* | 6/2011 | Bogner ............... G06F 9/4401 713/2 |
| 2011/0214013 A1 | 9/2011 | Bensinger |
| 2011/0258488 A1* | 10/2011 | Nightingale ........ G06F 11/1658 714/15 |
| 2012/0066677 A1 | 3/2012 | Tang |
| 2013/0262801 A1 | 10/2013 | Sancheti et al. |
| 2014/0281709 A1* | 9/2014 | D'Amato ............ G06F 11/1458 714/19 |

OTHER PUBLICATIONS

Recover Crashed System in Less Than a Minute; printed on Nov. 4, 2014; 5 pages https://www.vembu.com/disk-image-backup-lp1/.
SIRIS Business Continuity; http://www.technologyendeavors.com/backup.html; printed Nov. 4, 2014; 2 pages.

* cited by examiner

| Storage Volume Sector | Backup Image Sector | Present |
|---|---|---|
| 1 | 1 | Yes |
| 2 | 2 | No |
| 3 | 3 | No |

FIG. 5A

| Storage Volume Sector | Backup Image Sector | Present |
|---|---|---|
| 1 | 10003 | Yes |
| 2 | 14304 | No |
| 3 | 15660 | No |

FIG. 5B

BACKUP IMAGE RESTORE

BACKGROUND

Data stored in a storage device, such as a hard disk drive, may be susceptible to loss due to a variety of factors. For example, the data may be loss due to a hardware failure of the storage device, corruption from malware, etc. To reduce a likelihood of complete data loss a copy of the data may be stored in another storage device as a backup.

BRIEF DESCRIPTION OF THE DRAWINGS

Some examples of the present application are described with respect to the following figures:

FIG. 5A is a sector mapping lookup table used by a computing device to restore data from a backup image to a guest virtual machine, according to an example;

FIG. 5B is a sector mapping lookup table used by a computing device to restore data from a backup image to a guest virtual machine, according to another example.

DETAILED DESCRIPTION

To restore backup data to a computing device for use, the backup data may be copied or transferred from a backup location to the computing device during a restore operation. The backup location may be another computing device or a storage device that stores the backup data. The backup location may also be a storage area in the same storage device where the backup data is to be restored to another storage area of the storage device. As an example, a backup image containing contents of a storage device may be restored to a virtual machine. However, some data of the backup image may not be available locally for use by the virtual machine during the restore operation. Thus, a user of the virtual machine may experience a delay while the backup data is being restored.

Examples described herein provide a computing device to restore data from a backup image to a guest virtual machine that enables the guest virtual machine to access partially restored data during a restore operation. The computing device may include a virtual drive controller module to receive a read request from a guest virtual machine (VM) during a restore operation. The computing device may also include a virtual drive manager module to determine whether data associated with the read request is stored in a storage volume of the guest VM using a sector mapping lookup table. In response to a determination that the data is absent in the storage volume, the virtual drive manager module may copy the data from a backup image associated with the guest VM to the storage volume. The virtual drive manager module may also update the sector mapping lookup table to indicate that the data is stored in the storage volume. The virtual drive manager module may further transmit the data to the guest VM. In response to a determination that the data is present in the storage volume, the virtual drive manager module may further transmit the data to the guest VM. Thus, the guest VM may access data that is to be restored in the storage volume during the restore operation. In this manner, examples described herein may enable access to restored data prior to a completion of a restore operation.

Figure 1:
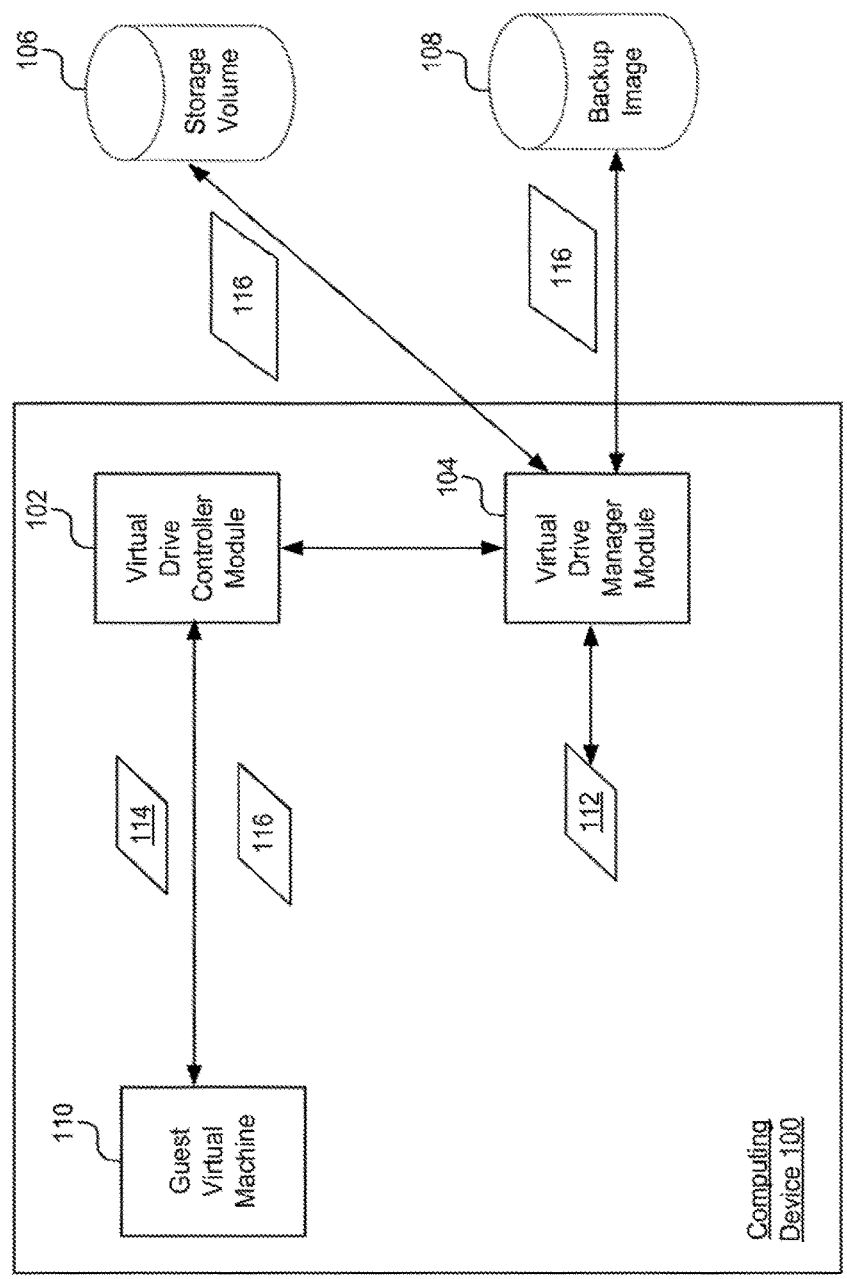
FIG. 1 is a block diagram of a computing device to restore data from a backup image to a guest virtual machine, according to an example.

Referring now to the figures, FIG. 1 is a block diagram of a computing device 100 to restore data from a backup image to a guest virtual machine, according to an example. Computing device 100 may be, for example, a web-based server, a local area network server, a cloud-based server, a notebook computer, a desktop computer, an all-in-one system, a tablet computing device, a mobile phone, an electronic book reader, or any other electronic device suitable for hosting a virtual machine. As used herein, a virtual machine may be an emulation of a computing device implemented using processor executable instructions, hardware, or a combination thereof.

Computing device 100 may include a virtual drive controller module 102 and a virtual drive manager module 104. Virtual drive controller module 102 and virtual drive manager module 104 may be implemented using processor executable instructions, hardware, such as a processor or a circuit, or a combination thereof. Virtual drive manager module 104 may be coupled to a storage volume 106 and to a backup image 108 via physical or logical connections.

Storage volume 106 may be a logical storage area or a logical drive implemented on at least one physical storage device, such as a hard disk drive. Backup image 108 may be a set of files containing structure and data from every sector of a particular storage volume. The set of files may include at least one file. In some examples, backup image 108 may include raw data from a disk. In some examples, backup image 108 may be a set of files containing structure and data from sectors of the particular storage volume that contain data. Backup image 108 may be used to restore content of the particular storage volume in another storage volume or at the same storage volume in the event of data loss or data corruption. Backup image 108 may be created via a sector-to-sector copy of the particular storage volume. In some examples, storage volume 106 and/or backup image 108 may be stored in computing device 100. In some examples, storage volume 106 and/or backup image 108 may be stored in another computing device or a storage device.

During operation, a user of computing device 100 may select backup image 108 to be restored to storage volume 106 via a data restore application implemented using processor executable instructions. When backup image 108 is selected for restoration, computing device 100 may perform a restore operation to restore backup image 108 to storage volume 106.

During the restore operation, computing device 100 may define components of guest virtual machine (VM) 110 and may allocate storage volume 106 to be a storage volume of guest VM 110. Virtual drive manager module 104 may access backup image 108 to determine a sector size of backup image 108 and a sector count of backup image 108. Based on the sector size and the sector count, virtual drive manager module 104 may allocate storage volume 106 to ensure that storage volume 106 may have sufficient storage capacity to restore backup image 108. Virtual drive manager module 104 may also generate a sector mapping lookup table 112 that links or maps each sector of backup image 108 to a distinct sector of storage volume 106. Virtual drive manager module 104 may use sector mapping lookup table 112 to determine a progress of the restore operation. Examples of sector mapping lookup table 112 are described in more detail in FIGS. 5A-5B.

When storage volume 106 is initially allocated, storage volume 106 does not contain content from backup image 108. Virtual drive manager module 104 may restore data from backup image 108 to storage volume 106 based on at least one read request received from guest VM 110. Guest VM 110 may read data from storage volume 106 via a read request 114 as soon as guest VM 110 is powered on. As an example, guest VM 110 may read data associated with a master boot record via read request 114 during a boot up process of guest VM 110.

Guest VM 110 may transit read request 114 to virtual drive controller module 102. Virtual drive controller module 102 may receive read request 114 and forward read request 114 to virtual drive manager module 104. Read request 114 may identify a sector, such as sector 1, of storage volume 106 that stores data 116 associated with read request 114. Virtual drive manager module 104 may use sector mapping lookup table 112 to determine whether sector 1 is present in storage volume 106.

In response to a determination that sector 1 is absent in storage volume 106 (i.e., sector 1 has not been restored from backup image 108), virtual drive manager module 104 may copy data 116 from a corresponding sector in backup image 108 and store data 116 to sector 1 of storage volume 106. Thus, data 116 is restored from backup image 108. Virtual drive manager module 104 may update sector mapping lookup table 112 to indicate that sector 1 is present in storage volume 106. Virtual drive manager module 104 may also transmit data 116 to guest VM 110 via virtual drive controller module 102 to complete read request 114. In some examples, backup image 108 may be set to read-only so that backup image 108 may not be modified (e.g., new data may not be written to backup image 108) and may be used for multiple restore operations.

In response to a determination that sector 1 is present is storage volume 106, which indicate that data 116 has been restored to storage volume 106, virtual drive manager module 104 may retrieve data 116 from storage volume 106 and transmit data 116 to guest VM 110 via virtual drive controller module 102. Once backup image 108 is fully restored to storage volume 106, the restore operation is completed. By restoring data from backup image 108 as requested by guest VM 110, the data from backup image 108 may be accessible to guest VM 110 prior to a completion of the restore operation. Thus, any delay perceived by a user of guest VM 110 due to the restore operation may be reduced.

Figure 2:
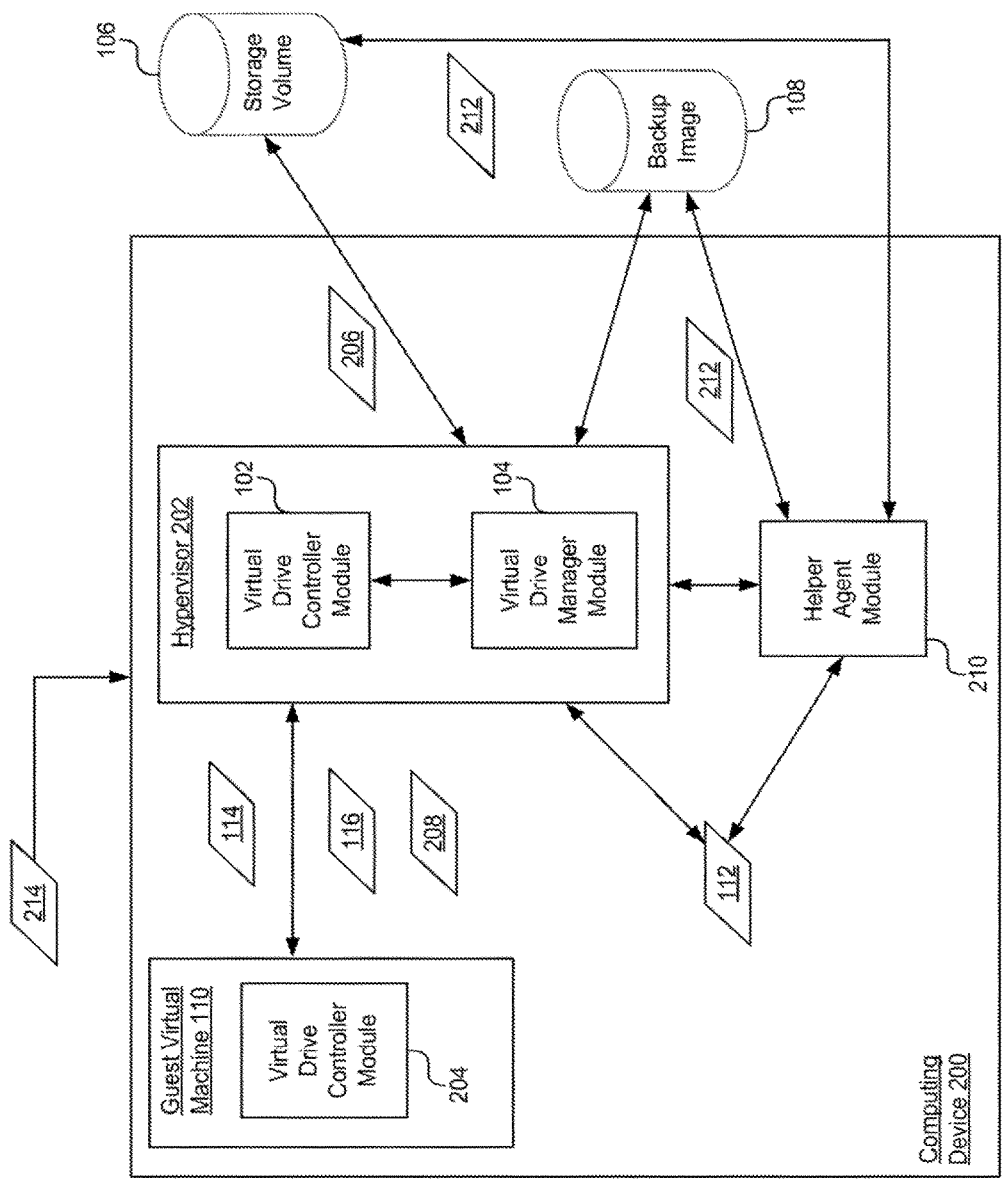
FIG. 2 is a block diagram of a computing device to restore data from a backup image to a guest virtual machine, according to another example.

FIG. 2 is a block diagram of a computing device 200 to restore data from a backup image to a guest virtual machine, according to another example. Computing device 200 may be similar to computing device 100 of FIG. 1. Computing device 200 may include a hypervisor 202. Hypervisor 202 may include virtual drive controller module 102 and virtual drive manager module 104. Hypervisor 202 may be a component of computing device 200 that creates and controls VMs hosted by computing device 200. Hypervisor 202 may be coupled to storage volume 106 and backup image 108 via virtual drive manager module 104.

Hypervisor 202 may be implemented using processor executable instructions, hardware, such as a processor or a circuit, or a combination thereof. In some examples, hypervisor 202 may be a type-1 hypervisor that is implemented using hardware. For example, hypervisor 202 may be running directly on a processor (not shown in FIG. 2) of computing device 200 and not contained within an operating system hosted by computing device 200. In some examples, hypervisor 202 may be a type-2 hypervisor that is implemented using processor executable instructions.

During operation, hypervisor 202 may receive a restore command 214 associated with backup image 108. For example, a user may select backup image 108 to be restored via a restore application (not shown in FIG. 2) implemented using processor executable instructions. The restore application may be executing on computing device 200. Based on restore command 214, hypervisor 202 may initiate a restore operation to restore backup image 108.

Hypervisor 202 may query backup image 108 to generate sector mapping lookup table 112 and to allocate storage volume 106 based on the sector size and the sector count of backup image 108. Hypervisor 202 may create guest VM 110 and assign storage volume 106 to guest VM 110. Hypervisor 202 may also control operations of guest VM 110. Guest VM 110 may be hosted in computing device 200. Guest VM 110 may include a virtual drive controller module 204 to transmit at least one read request or at least one write request to hypervisor 202.

Hypervisor 202 may enable guest VM 110 for use by booting up guest VM 110. Hypervisor 202 may restore data (e.g., data 116) from backup image 108 to storage volume 106 via at least one read request (e.g., read request 114) from guest VM 110 using virtual drive controller module 102 and virtual drive manager module 104 as described in FIG. 1. Hypervisor 202 may also update sector mapping lookup table 112 based on at least one write request from guest VM 110. For example, guest VM 110 may write data 206 to a particular sector of storage volume 106, such as sector 2 of storage volume 106, via a write request 208. Guest VM 110 may transmit write request 208 to hypervisor 202 via virtual drive controller module 204. Virtual drive controller module 102 of hypervisor 202 may receive write request 208 and forward write request 208 to virtual drive manager module 104. Virtual drive manager module 104 may write data 206 to sector 2 of storage volume 106 based on write request 208. Virtual drive manager module 104 may also update sector mapping lookup table 112 to indicate that sector 2 is present in storage volume 106.

In some examples, in addition to restoring data via ongoing read requests from guest VM 110 and updating sector mapping lookup table 112 via ongoing write requests, computing device 200 may also include a helper agent module 210 to restore data from backup image 108 to storage volume 106. Helper agent module 210 may be implemented using processor executable instructions, hardware, such as a processor or a circuit, or a combination thereof.

Helper agent module 210 may restore data that has not been restored via ongoing read requests or data in sector mapping lookup table 112 that has not been written to storage volume 106 via ongoing write requests (e.g., data not associated with read request 114 or write request 208). For example, helper agent module 210 may access sector mapping lookup table 112 to determine what sectors have not been restored from backup image 108. Based on sector mapping lookup table 112, helper agent module 210 may determine that sector 3 of storage volume 106 is absent (i.e., sector 3 has not been restored). Thus, helper agent module 210 may copy remaining data 212 from a sector in backup image 108 that is mapped to sector 3 of storage volume 106 and store remaining data 212 to sector 3.

In some examples, helper agent module 210 may restore data from backup image 108 based on a smart schedule so as not to conflict with other resource requirements of guest VM 110 and/or hypervisor 202. In some examples, helper agent module 210 may be included in hypervisor 202. In some examples, helper agent module 210 may be included in guest VM 110.

Figure 3:
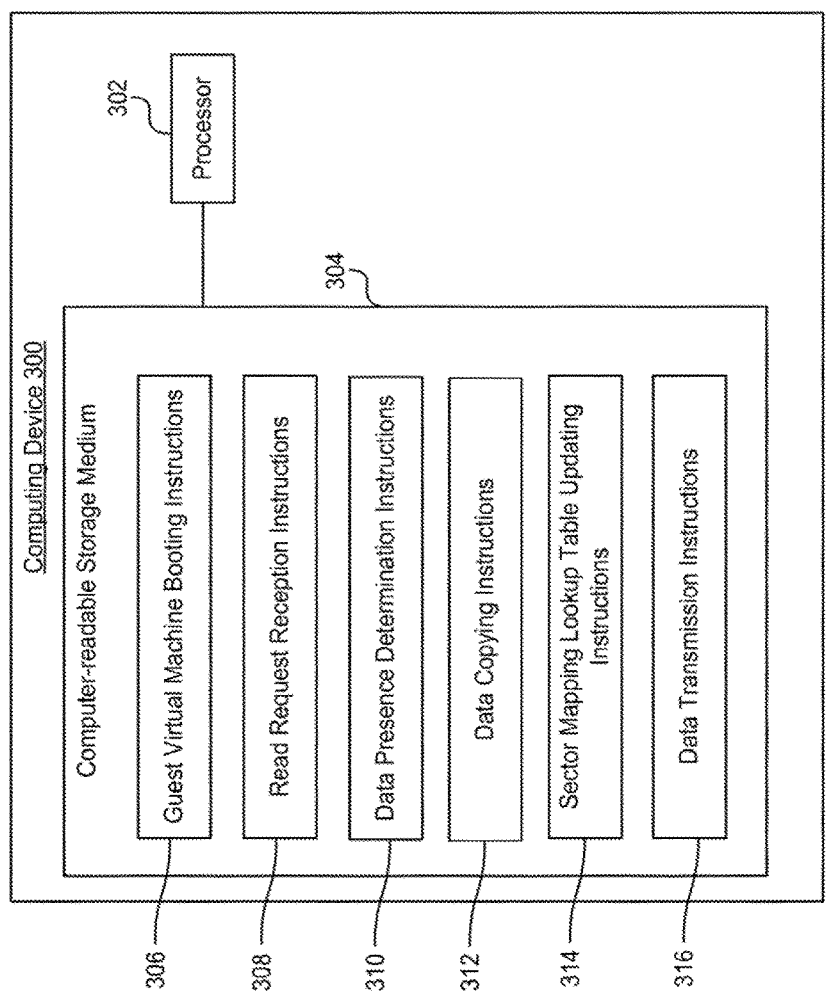
FIG. 3 is a block diagram of a computing device to restore data from a backup image to a guest virtual machine, according to another example.

FIG. 3 is a block diagram of a computing device 300 to restore data from a backup image to a guest virtual machine, according to another example. Computing device 300 may be used to implement computing device 100 of FIG. 1 and/or computing device 200 of FIG. 2. Computing device 300 may include a processor 302 and a computer-readable storage medium 304.

Processor 302 may be a central processing unit (CPU), a semiconductor-based microprocessor, and/or other hardware devices suitable for retrieval and execution of instructions stored in computer-readable storage medium 304. Processor 302 may fetch, decode, and execute instructions 306, 308, 310, 312, 314, and 316 to control a process restoring data from a backup image, such as backup image 108 of FIG. 1, to a storage volume, such as storage volume 106. As an alternative or in addition to retrieving and executing instructions, processor 302 may include at least one electronic circuit that includes electronic components for performing the functionality of any of the instructions 306-314.

Computer-readable storage medium 304 may be any electronic, magnetic, optical, or other physical storage device that contains or stores executable instructions. Thus, computer-readable storage medium 304 may be, for example, Random Access Memory (RAM), an Electrically Erasable Programmable Read-Only Memory (EEPROM), a storage device, an optical disc, etc. In some examples, computer-readable storage medium 304 may be a non-transitory storage medium, where the term "non-transitory" does not encompass transitory propagating signals. As described in detail below, computer-readable storage medium 304 may be encoded with a series of processor executable instructions 306-314 for restoring data from a backup image to a storage volume.

Guest virtual machine booting instructions 306 may create, provision, and control a guest virtual machine. For example, referring to FIG. 2, hypervisor 202 may enable guest VM 110 for use and start a restore operation of backup image 108 by booting up guest VM 110. Read request reception instructions 308 may receive a read request from a virtual machine. For example, referring to FIG. 1, virtual drive controller module 102 may receive read request 114 and forward read request 114 to virtual drive manager module 104.

Data presence determination instructions 310 may determine whether a sector that stores data associated with a read request is present in a storage volume. For example, referring to FIG. 1, virtual drive manager module 104 may use sector mapping lookup table 112 to determine whether sector 1 is present in storage volume 106. Data copying instruction 312 may copy data from a backup image to a storage volume via sector-to-sector copying. For example, in response to a determination that sector 1 is absent in storage volume 106, virtual drive manager module 104 may copy data 116 from a corresponding sector in backup image 108 and store data 116 to sector 1 of storage volume 106.

Sector mapping table updating instructions 314 may update a sector mapping table to indicate a progress of a restore operation after a sector is restored based on a read request or a sector is written to storage volume 106 based on a write request. For example, virtual drive manager module 104 may update sector mapping lookup table 112 to indicate that sector 1 is present in storage volume 106. Data transmission instructions 316 may transmit data from a storage volume to a virtual machine. For example, virtual drive manager module 104 may also transmit data 116 to guest VM 110 via virtual drive controller module 102 to complete read request 114.

Figure 4:
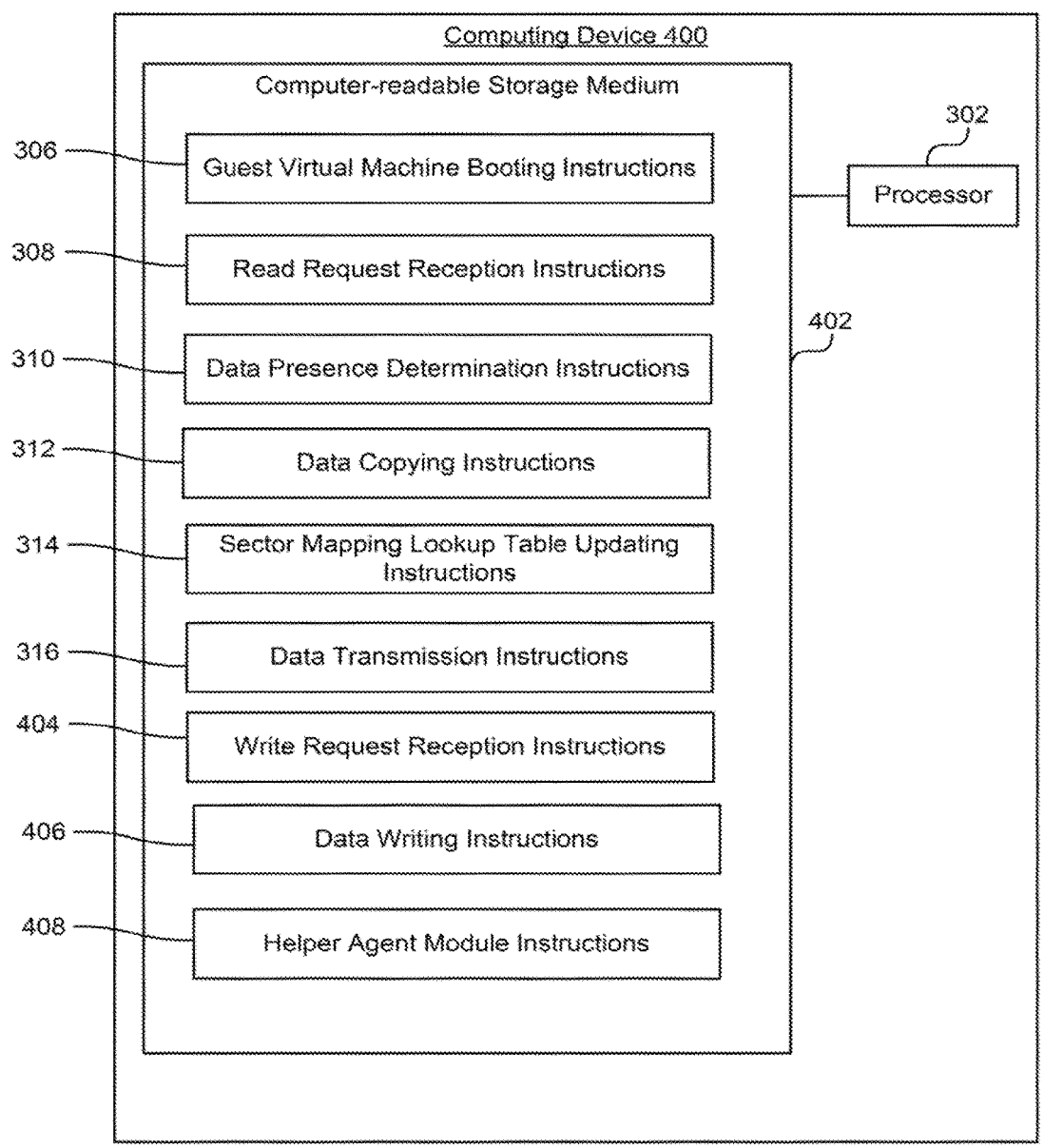
FIG. 4 is a block diagram of a computing device to restore data from a backup image to a guest virtual machine, according to another example.

FIG. 4 is a block diagram of a computing device 400 to restore data from a backup image to a guest virtual machine, according to another example. Computing device 400 may be used to implement computing device 100 of FIG. 1, computing device 200 of FIG. 2, and/or computing device 300 of FIG. 3. Computing device 400 may include processor 302 and a computer-readable storage medium 402. Computer-readable storage medium 402 may be similar to computer-readable storage medium 304 of FIG. 3.

Computer-readable storage medium 402 may be encoded with instructions 306-316 and 404-408. Write request reception instructions 404 may receive a write request from a virtual machine. For example, referring to FIG. 2, virtual drive controller module 102 of hypervisor 202 may receive write request 208 and forward write request 208 to virtual drive manager module 104. Data writing instructions 406 may write data to a storage volume based on a write request. For example, referring to FIG. 2, virtual drive manager module 104 may write data 206 to sector 2 of storage volume 106 based on write request 208. Helper agent module instructions 408 may implement helper agent module 210 of FIG. 2.

FIG. 5A is a sector mapping lookup table 500 used by a computing device to restore data from a backup image to a guest virtual machine, according to an example. Sector mapping lookup table 500 may be used to implement sector mapping lookup table 112 of FIGS. 1-2. Sector mapping lookup table 500 is described with reference to FIGS. 1-2. Sector mapping lookup table 500 may include a plurality of fields, such as a storage volume sector field 502, a backup image sector field 504, and a presence field 506. Storage volume sector field 502 may be indicative of sectors of storage volume 106. Backup image sector field 504 may be indicative of corresponding sectors of backup image 108 that are mapped to each distinct sector of storage volume 106. Presence field 506 may be indicative of whether particular sectors of storage volume 106 are present in storage volume 106. The presence of the particular sectors may be indicative of a progress of a restore operation. For example, when presence field 506 indicates "Yes" for every entry of sector mapping lookup table 500, the restore operation may be completed.

For example, an entry 508 of sector mapping lookup table 500 may indicate that sector 1 of storage volume 106 is mapped to sector 1 of backup image 108 using virtual direct mapping. The actual location of sector 1 of backup image 108 may be sector 100 of a hard disk drive. Hypervisor 202 may determine the actual location of sector 1 of backup image 108 before copying data from sector 1 of backup image 108 to sector 1 of storage volume 106. Entry 508 may also indicate that sector 1 of storage volume 106 is present in storage volume 106 as presence field 506 indicates "Yes" for entry 508.

As another example, an entry 510 of sector mapping lookup table 500 may indicate that sector 2 of storage volume 106 is mapped to sector 2 of backup image 108. However, as presence field 506 indicates "No" for entry 510, sector 2 of backup image 108 has not been restored to sector 2 of storage volume 106. When sector 2 of backup image 108 has been restored to sector 2 of storage volume 106, hypervisor 202 may update presence field 506 to "Yes" for entry 510.

In some examples, sector mapping lookup table 500 may include only used sectors (i.e., sectors containing data) from backup image 108 to reduce the amount of data to be restored. In some examples, sector mapping lookup table 500 may include both used sectors and unused sectors from backup image 108 so that every sector of backup image 108 is restored. In some examples, when unused sectors are included in sector mapping lookup table 500, hypervisor 202 and/or helper agent module 210 may identify unused sectors in backup image 108 by querying backup image 108. Hypervisor 202 and/or helper agent module 210 may update the sector mapping lookup table 500 to indicate that the unused sectors are present in storage volume 106.

FIG. 5B is a sector mapping lookup table 512 used by a computing device to restore data from a backup image to a guest virtual machine, according to another example. Sector mapping lookup table 512 may store volume sector field 502, backup image sector field 504, and presence field 506. Unlike the virtual direct mapping used in sector mapping lookup table 500 of FIG. 5A, sector mapping lookup table 512 may map a sector of storage volume 106 to the actual location of a corresponding sector of backup image 108. For example, an entry 514 of sector mapping lookup table 512 may indicate that sector 1 of storage volume 106 is mapped to sector 10003 of backup image 108. Thus, hypervisor 202 may copy data from sector 10003 of backup image 108 and store the data to sector 1 of storage volume 106.

Figure 6:
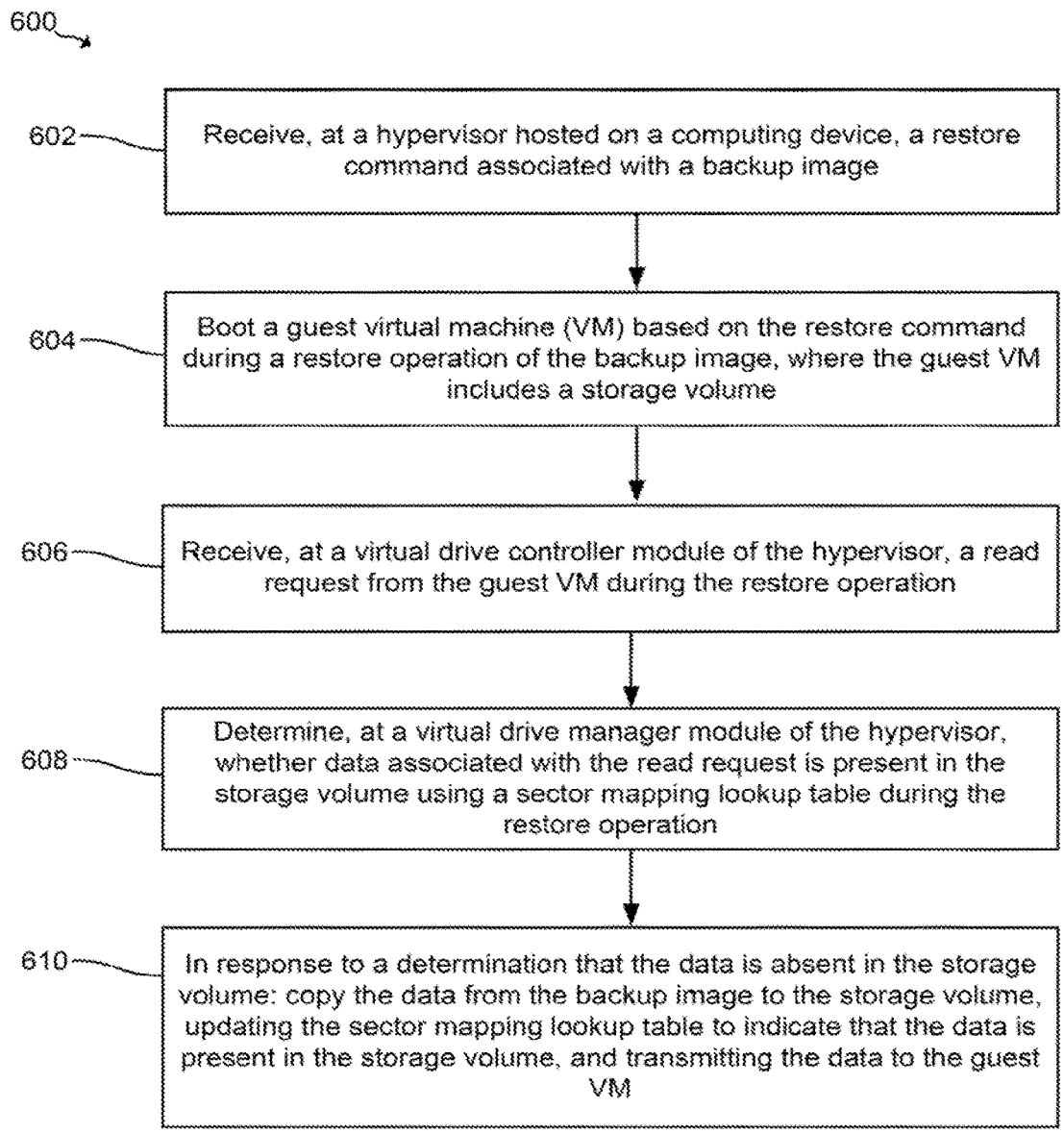
FIG. 6 is a flowchart illustrating a method of operation at a computing device to restore data from a backup image to a guest virtual machine, according to an example.

FIG. 6 is a flowchart illustrating a method 600 of operation at a computing device to restore data from a backup image to a guest virtual machine, according to an example. Method 600 may be implemented using computing device 100 of FIG. 1, computing device 200 of FIG. 2, computing device 300 of FIG. 3, and/or computing device 400 of FIG. 4.

Method 600 includes receiving, at a hypervisor hosted on a computing device, a restore command associated with a backup image, at 602. For example, referring to FIG. 2, hypervisor 202 may be hosted on a processor (not shown in FIG. 2) of computing device 200. Method 600 also includes booting a guest virtual machine (VM) based on the restore command during a restore operation of the backup image, where the guest VM includes a storage volume, at 604. For example, hypervisor 202 may enable guest VM 110 for use by booting up guest VM 110.

Method 600 further includes receiving, at a virtual drive controller module of the hypervisor, a read request from the guest VM during the restore operation, at 606. For example, referring to FIG. 1, virtual drive controller module 102 may receive read request 114 and forward read request 114 to virtual drive manager module 104. Method 600 further includes determining, at a virtual drive manager module of the hypervisor, whether data associated with the read request is present in the storage volume using a sector mapping lookup table during the restore operation, at 608. For example, referring to FIG. 1, virtual drive manager module 104 may use sector mapping lookup table 112 to determine whether sector 1 is present in storage volume 106.

Method 600 further includes in response to a determination that the data is absent in the storage volume, copying the data from the backup image to the storage volume, updating the sector mapping lookup table to indicate that the data is present in the storage volume, and transmitting the data to the guest VM, at 610. For example, referring to FIG. 1, in response to a determination that sector 1 is absent in storage volume 106, virtual drive manager module 104 may copy data 116 from a corresponding sector in backup image 108 and store data 116 to sector 1 of storage volume 106. Virtual drive manager module 104 may update sector mapping lookup table 112 to indicate that sector 1 is present in storage volume 106. Virtual drive manager module 104 may also transmit data 116 to guest VM 110 via virtual drive controller module 102 to complete read request 114.

The use of "comprising", "including" or "having" are synonymous and variations thereof herein are meant to be inclusive or open-ended and do not exclude additional unrecited elements or method steps.

What is claimed is:

1. An apparatus comprising:
   a virtual drive controller module to receive a read request from a guest virtual machine (VM) during a restore operation; and
   a virtual drive manager module to:
      determine whether data associated with the read request is stored in a storage volume of the guest VM using a sector mapping lookup table during the restore operation;
      in response to a determination that the data is absent in the storage volume:
         copy the data from a backup image associated with the guest VM to the storage volume;
         update the sector mapping lookup table to indicate that the data is stored in the storage volume; and
         transmit the data to the guest VM; and
      access the sector mapping lookup table to determine whether the restore operation is complete.

2. The apparatus of claim 1, wherein the virtual drive controller module is further to receive a write request from the guest VM, and wherein the virtual drive manager module is further to:
   write data associated with the write request to the storage volume; and
   update the sector mapping lookup table to indicate that the data associated with the write request is present in the storage volume.

3. The apparatus of claim 1, further comprising a helper agent module to:
   copy remaining data from the backup image to the storage volume using the sector mapping lookup table during the restore operation, wherein the remaining data is not associated with the read request; and
   update the sector mapping lookup table to indicate that the remaining data is present in the storage volume.

4. The apparatus of claim 1, wherein the sector mapping lookup table is indicative of sectors in the storage volume.

5. The apparatus of claim 1, wherein the backup image is read-only.

6. The apparatus of claim 1, wherein in response to determination of the restore operation being complete, exit the restore operation and serve subsequent read requests for data from the guest VM directly from the storage volume.

7. The apparatus of claim 1, wherein the virtual drive manager module is to:
   in response to a determination that the data is present in the storage volume:
      transmit the data from the storage volume to the guest VM without accessing the backup image; and
      restore further data in the storage volume as part of the restore operation.

8. A method comprising:
   receiving, at a hypervisor hosted on a computing device, a restore command associated with a backup image;

booting a guest virtual machine (VM) based on the restore command during a restore operation of the backup image, wherein the guest VM includes a storage volume;

receiving, at a virtual drive controller module of the hypervisor, a read request from the guest VM during the restore operation;

determining, at a virtual drive manager module of the hypervisor, whether data associated with the read request is present in the storage volume using a sector mapping lookup table during the restore operation;

in response to a determination that the data is absent in the storage volume:
  copying the data from the backup image to the storage volume;
  updating the sector mapping lookup table to indicate that the data is present in the storage volume; and
  transmitting the data to the guest VM; and accessing the sector mapping lookup table to determine whether the restore operation is complete.

9. The method of claim 8, further comprising:
receiving, a write request from the guest VM
writing data associated with the write request to the storage volume via the virtual drive manager module; and
updating the sector mapping lookup table to indicate that the data associated with the write request is present in the storage volume.

10. The method of claim 8, wherein the sector mapping lookup table includes a storage volume sector field, a backup image sector field, and a presence field.

11. The method of claim 8, further comprising provisioning the guest VM via the hypervisor, wherein provisioning the guest VM includes:
determining a sector size of the backup image and a sector count of the backup image; and
allocating the storage volume based on the sector size and the sector count.

12. The method of claim 8, further comprising:
identifying unused sectors in the backup image; and
updating the sector mapping lookup table to indicate that the unused sectors are present in the storage volume.

13. The method of claim 8, wherein the hypervisor is a type-1 hypervisor.

14. The method of claim 8, wherein in response to determination that the restore operation is complete, exiting the restore operation and serving subsequent requests for data from the guest VM directly from the storage volume.

15. A non-transitory computer-readable storage medium comprising instructions that when executed cause a processor of a computing device to:
boot, at a hypervisor, a guest virtual machine (VM) based on a restore command associated with a backup image during a restore operation of the backup image, wherein the guest VM includes a storage volume;
receive, at a virtual drive controller module of the hypervisor, a read request from the guest VM during the restore operation;
determine, at a virtual drive manager module of the hypervisor, whether data associated with the read request is present in the storage volume using a sector mapping lookup table during the restore operation;
in response to determining that the data is absent in the storage volume:
  copy the data from the backup image to the storage volume;
  update the sector mapping lookup table to indicate that the data is stored in the storage volume; and
  transmit the data to the guest VM; and
in response to determining that the data is present in the storage volume, transmit the data from the storage volume to the guest VM without accessing the backup image; and
access the sector mapping lookup table to determine whether the restore operation is complete.

16. The non-transitory computer-readable storage medium of claim 15, wherein the instructions when executed further cause the processor to, in response to a write request received from the guest VM:
write data associated with the write request to the storage volume via the virtual drive manager module; and
update the sector mapping lookup table to indicate that the data associated with the write request is present in the storage volume.

17. The non-transitory computer-readable storage medium of claim 15, wherein the instructions when executed further cause the processor to:
identify unused sectors in the backup image; and
update the sector mapping lookup table to indicate that the unused sectors are present in the storage volume.

18. The non-transitory computer-readable storage medium of claim 15, wherein the instructions when executed further cause the processor to:
copy, via a helper agent module, remaining data from the backup image to the storage volume using the sector mapping lookup table during the restore operation, wherein the remaining data is not associated with the read request; and
update the sector mapping lookup table to indicate that the remaining data is present in the storage volume.

19. The non-transitory computer-readable storage medium of claim 15, wherein the instructions when executed further cause the processor to, in response to determination that the restore operation is complete, exit the restore operation and serve subsequent requests for data from the guest VM directly from the storage volume.

20. The non-transitory computer-readable storage medium of claim 15, wherein the instructions when executed further cause the processor to, in response to the data associated with the read request being in the storage volume, provide the data from the storage volume to the VM while further data in the storage volume is being restored as part of the restore operation.

* * * * *